United States Patent
Krauthamer et al.

(10) Patent No.: US 12,554,122 B2
(45) Date of Patent: Feb. 17, 2026

(54) TECHNIQUES FOR PRODUCING IMAGERY IN A VISUAL EFFECTS SYSTEM

(71) Applicant: Universal City Studios LLC, Universal City, CA (US)

(72) Inventors: Akiva Meir Krauthamer, Winter Garden, FL (US); Timothy Fitzgerald Garnier, Orlando, FL (US); Aaron Chandler Jeromin, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/375,094

(22) Filed: Sep. 29, 2023

(65) Prior Publication Data

US 2025/0035918 A1 Jan. 30, 2025

Related U.S. Application Data

(60) Provisional application No. 63/528,585, filed on Jul. 24, 2023.

(51) Int. Cl.
| | | |
|---|---|---|
| G02B 26/08 | (2006.01) | |
| G02B 30/56 | (2020.01) | |
| H04N 13/322 | (2018.01) | |
| H04N 13/393 | (2018.01) | |

(52) U.S. Cl.
CPC ......... *G02B 26/0816* (2013.01); *G02B 30/56* (2020.01); *H04N 13/322* (2018.05); *H04N 13/393* (2018.05)

(58) Field of Classification Search
CPC .. G02B 26/0816; G02B 30/56; H04N 13/322; H04N 13/393

USPC .......................................................... 348/51
See application file for complete search history.

(56) References Cited

U.S. PATENT DOCUMENTS

| | | |
|---|---|---|
| 5,148,310 A | 9/1992 | Batchko |
| 5,954,414 A | 9/1999 | Tsao |
| 7,724,251 B2 | 5/2010 | Balakrishnan et al. |
| 10,818,090 B2 | 10/2020 | Krauthamer |
| 2011/0249201 A1 | 10/2011 | Turner et al. |
| 2014/0028663 A1 | 1/2014 | Smithwck et al. |
| 2017/0097511 A1* | 4/2017 | Xu .................. G02B 30/40 |
| 2017/0371172 A1 | 12/2017 | Keane et al. |
| 2018/0259784 A1* | 9/2018 | Joseph ............... G02B 3/14 |

(Continued)

FOREIGN PATENT DOCUMENTS

WO 2017055894 A1 4/2017

OTHER PUBLICATIONS

U.S. Appl. No. 63/461,392, filed Apr. 24, 2023, Aaron Chandler Jeromin.

(Continued)

*Primary Examiner* — Christopher S Kelley
*Assistant Examiner* — Ana Picon-Feliciano
(74) *Attorney, Agent, or Firm* — Fletcher Yoder, P.C.

(57) ABSTRACT

A visual effects system includes a display configured to present a series of image frames and a mirror positioned to reflect the series of image frames to generate reflected image frames. The visual effects system also includes a drive system coupled to the mirror, wherein the drive system is configured to drive movement of the mirror to adjust a perceived depth of the reflected image frames to produce volumetric imagery for visualization by a guest.

19 Claims, 8 Drawing Sheets

(56) References Cited

U.S. PATENT DOCUMENTS

| | | | |
|---|---|---|---|
| 2021/0364789 A1* | 11/2021 | Jeromin | G02B 27/0172 |
| 2022/0137428 A1 | 5/2022 | Krauthamer et al. | |
| 2022/0283445 A1* | 9/2022 | Smithwick | G03B 21/2066 |

OTHER PUBLICATIONS

PCT/US2024/038686 International Search Report and Written Opinion mailed Oct. 31, 2024.

* cited by examiner

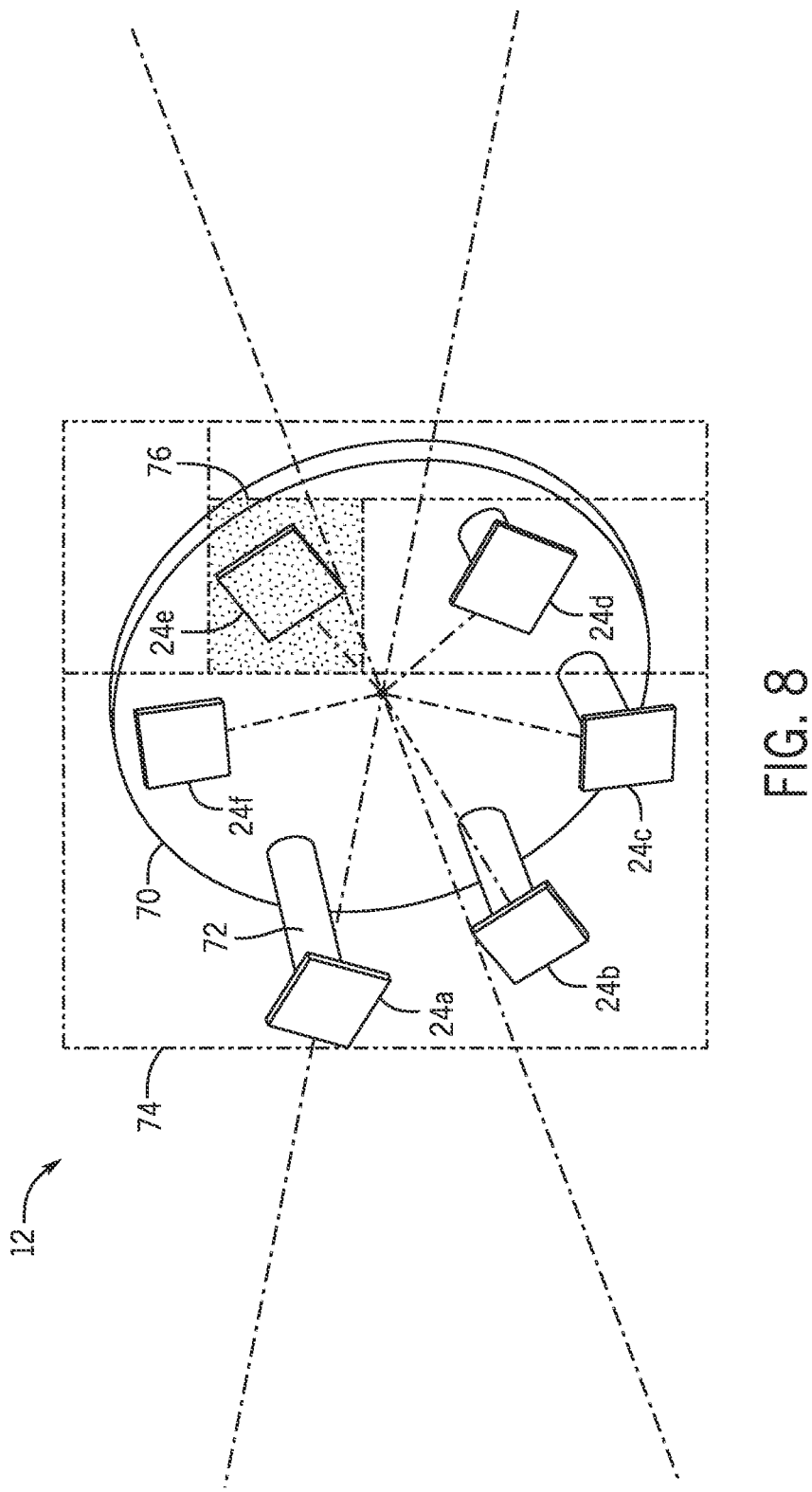

TECHNIQUES FOR PRODUCING IMAGERY IN A VISUAL EFFECTS SYSTEM

CROSS-REFERENCE TO RELATED APPLICATION

This application claims priority to and the benefit of U.S. Provisional Application No. 63/528,585, entitled "TECHNIQUES FOR PRODUCING IMAGERY IN A VISUAL EFFECTS SYSTEM" and filed Jul. 24, 2023, which is incorporated by reference herein in its entirety for all purposes.

BACKGROUND

The present disclosure generally relates to a visual effects system that provides visual effects in a venue, such as in an amusement park.

A venue, such as an amusement park, may include a variety of attractions. Some attractions may include displays (e.g., monitors, digital screens, volumetric displays, and/or other displays) to provide images for visualization by guests in the attractions. In some cases, the displays may move to provide special image effects to immerse the guests in the attractions. With increasing sophistication and complexity of modern ride attractions, it is presently recognized that it may be desirable to provide improved systems to create visual effects to create unique experiences for the guests in the attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a visual effects system includes a display configured to present a series of image frames and a mirror positioned to reflect the series of image frames to generate reflected image frames. The visual effects system also includes a drive system coupled to the mirror, wherein the drive system is configured to drive movement of the mirror to adjust a perceived depth of the reflected image frames to produce volumetric imagery for visualization by a guest.

In an embodiment, a method of operating a visual effects system includes generating, at one or more processors, image data for a display, and transmitting, via the one or more processors, the image data to the display, wherein the display is configured to display a series of image frames based on the image data. Further, the method includes reflecting, via a mirror, the series of image frames to generate reflected image frames, and moving, via a drive system, the mirror to adjust a perceived depth of the reflected image frames to produce volumetric imagery for visualization by a guest.

In an embodiment, a visual effects system includes a display configured to present a series of image frames, and a mirror positioned to reflect the series of image frames to generate reflected image frames. The visual effects system also includes a beam splitter positioned to direct the reflected image frames to a visualization area, and a drive system coupled to the mirror, wherein the drive system is configured to drive movement of the mirror to adjust a perceived depth of the reflected image frames in the visualization area for visualization by a guest.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a perspective view of a visual effects system, wherein visual effects are viewable via a disk with multiple mirror segments, in accordance with an embodiment of the present disclosure.

DETAILED DESCRIPTION

Figure 1:
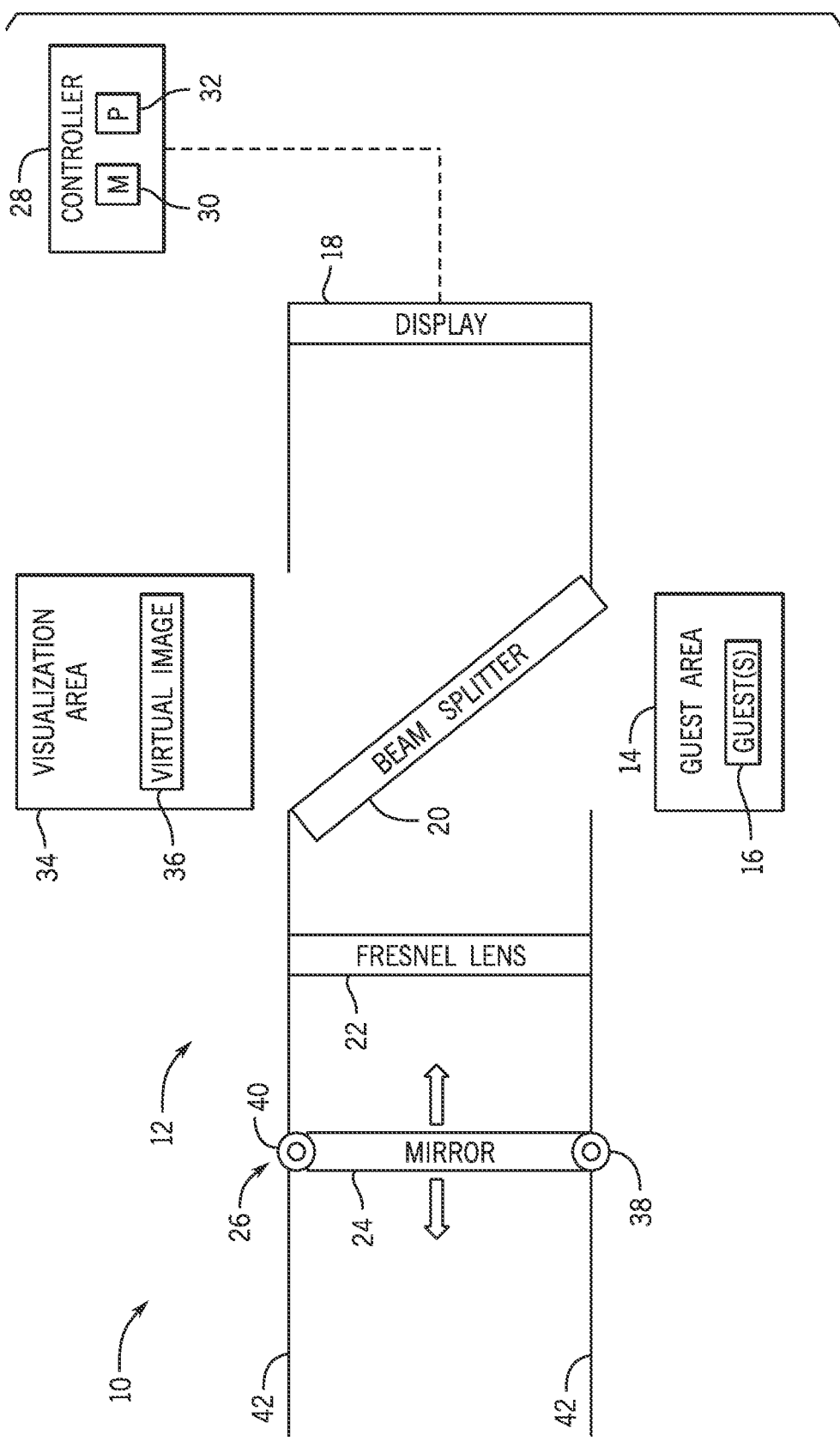
FIG. 1 is a schematic diagram of an attraction that includes a visual effects system with a mirror in a first position, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a visual effects system that provides visual effects (e.g., image effects; volumetric imagery). The visual effects system may operate in any of a variety of venues, such as in an amusement park, a restaurant, a hotel, a theatre, a stadium, and so forth. The venue may include a variety of features, such as rides (e.g., a roller coaster), theatrical shows, set designs, performers, and/or decoration elements, to entertain guests. The visual effects may be used to supplement or complement the features, such as to provide the guests with a more immersive and/or unique experience. For example, the visual effects may be presented to emulate real-world elements in order to present a more realistic atmosphere for the guests.

The visual effects system may provide a variety of visual effects. For example, the visual effects system may display virtual objects that may supplement an appearance of real-world objects and/or other virtual objects via a Pepper's Ghost system. Generally, the Pepper's Ghost system may employ a display, a Fresnel lens, a mirror, and/or an optical beam splitter (e.g., glass). To enable a guest to view imagery, the display may emit light through the optical beam splitter, which may direct the light to pass through the Fresnel lens. Further, the light may reflect off the mirror, pass through the Fresnel lens again, and then reflect off the optical beam splitter. As such, the guest may observe the imagery in a visualization area that appears to be behind the optical beam splitter relative to a guest area. In this way, the visual effects system may realistically portray elements of imagery such that the guest perceives the elements as physically present. Indeed, the visual effects system may utilize certain Pepper's Ghost techniques to provide a more realistic portrayal of imagery.

The visual effects system may also include features that allow for translation (e.g., movement) of imagery through an environment. Further, the features may allow for volumetric (e.g., three-dimensional (3D)) imagery to be perceived by the guest. That is, the mirror may be mounted on a drive system (e.g., a mechanical device) that moves (e.g., oscillates) the mirror toward and away from the optical beam splitter (e.g., closer to the optical beam splitter and farther away from the optical beam splitter) at various speeds (e.g., low speed, medium speed, or high speed). A display volume depth (e.g., perceived depth) of the imagery as displayed for visualization by the guest may be double a distance of travel of the mirror. For example, if the mirror travels one unit away from the optical beam splitter, the imagery may appear to move two units away from the guest. Therefore, by updating the imagery produced by the display in coordination with movement of the mirror, unique imagery may be displayed to the guest at different depths (e.g., closer to the guest or farther away from the guest). Moreover, the imagery may appear larger to the guest or smaller to the guest as the imagery is displayed at different depths. Additionally, when the drive system moves the mirror toward and away from the optical beam splitter at the high speed, the guest may perceive time-sequenced images presented by the display as the volumetric imagery.

In one embodiment, the visual effects system may be devoid of the Fresnel lens and/or the beam splitter. Further, the drive system of the visual effects system may include a first movement mechanism (e.g., a wheel; a rotatable structure), a second movement mechanism (e.g., a wheel; a rotatable structure), and at least one motor that drives rotation of the first movement mechanism and the second movement mechanism. In some embodiments, the first movement mechanism and the second movement mechanism may be connected via a linkage. Thus, the at least one motor may include a single motor that drives rotation of the first movement mechanism, and the linkage causes the second movement mechanism to rotate simultaneously or together with the first movement mechanism. The first movement mechanism and the second movement mechanism may rotate in a clockwise or counterclockwise direction to cause motion of the mirror mounted thereto. Therefore, the mirror may oscillate by moving about a rotational or center axis (e.g., with components forward, backward, to the left, and/or to the right), which may cause the imagery to appear at different perceived depths for visualization by the guest (e.g., at different locations forward, backward, to the left, and/or to the right).

In one embodiment, the display may be positioned at a height above the guest who is facing the mirror, and the mirror may be positioned in front of the guest and/or the display. The mirror may move, via the drive system, closer to the guest and/or the display or further away from the guest and/or the display. Moreover, the display may produce imagery that may reflect off the mirror and enable the guest to view the imagery produced by the display. As described above, movement of the mirror may affect presentation of the depth of the imagery and the size of the imagery as visualized by the guest. Additionally, when the mirror movement is at the high speed, the volumetric imagery may be perceived by the guest.

In one embodiment, the visual effects system may include an additional mirror. The display may be positioned at a height above the guest who is facing the mirror. Additionally, the mirror may be positioned facing the display, and the additional mirror may be positioned in front of the mirror and/or the guest. Further, the mirror and the additional mirror may move, via the drive system, forward and backward (e.g., either in the same direction or in different directions). Moreover, the display may produce imagery that may reflect off the mirror, which may sequentially reflect onto the additional mirror, and thereby enable the guest to view the imagery produced by the display. Movement of the mirror and the additional mirror may increase the display volume depth of the imagery displayed by a factor of two.

In one embodiment, the visual effects system may include a transparent display. The transparent display may include any type of electronic display that may allow the guest to see through the display to view the imagery behind the display relative to the guest. The transparent display may be positioned between the mirror and the guest. The display may produce the imagery that may reflect off the mirror. The guest may look through the transparent display and directly at the mirror to view the imagery. As disclosed herein, the mirror may move, via the drive system, closer to the display and further away from the display to affect the depth of the imagery presented and/or produce the volumetric imagery.

In one embodiment, the mirror may be replaced by a disk (e.g., rotatable structure) including multiple mirror segments (e.g., as part of the mirror or in a mirror assembly). Each mirror of the multiple mirror segments may be raised at a different respective height (e.g., offset distance) relative to the disk. The multiple mirror segments may be covered by a cover with an opening, such that only a single mirror segment of the multiple mirror segments at a time reflects the imagery. The disk may rotate (e.g., spin) to sequentially reveal (e.g., one at a time; via alignment with the opening in the cover) each mirror segment of the multiple mirror segments. In this manner, the depth of the imagery presented may be affected and/or the volumetric imagery may be produced.

With the preceding in mind, FIG. 1 is a schematic view of an attraction 10 (e.g., environment or venue) that includes a visual effects system 12 with a mirror 24 in a first position, in accordance with an embodiment of the present disclosure. The attraction 10 may include a guest area 14 where one or more guests 16 may be positioned. As an example, the guest area 14 may include a path (e.g., a walkway, a queue, a line, a moving conveyor) through which the guest(s) 16 may navigate. As another example, the guest area 14 may include a space (e.g., a seating area) where the guest(s) 16 may be positioned to view a performance. As a further example, the guest area 14 may include a ride vehicle that may move and carry the guest(s) 16 throughout the attraction 10.

Furthermore, the attraction 10 may include the visual effects system 12 that may provide entertainment to the guest(s) 16 located in the guest area 14 and/or in the attraction 10. For example, the visual effects system 12 may create visual effects that are viewable by the guest(s) 16. The visual effects system 12 may include a display 18, a beam splitter 20 (e.g., a glass), a Fresnel lens 22 (e.g., a compact lens), the mirror 24 (e.g. a reflector), a drive system 26, and a controller 28 (e.g., electronic controller). The controller 28 may include a memory 30 and a processor 32. Additionally, the visual effects system 12 may include a visualization area 34, which may represent a location at which the guest(s) 16 may view a virtual image 36 (e.g., reflected image; object and/or character, such as a building, a car, a piece of furniture, a person, a cartoon figure, and/or an animal) while the guest(s) 16 are in the guest area 14.

The display 18 may include any suitable display (e.g., liquid crystal display (LCD), light emitting diode (LED) display, organic light emitting diode (OLED) display, micro-LED, transparent LCD display) that receives image data and projects (e.g., displays, transmits) the image data as imagery, such as a series of image frames. In one embodiment, the display 18 may include a two-dimensional (2D) display. In one embodiment, the display 18 may include a transparent display (e.g., see-through display), such as a transparent LED display or a transparent OLED display. The display 18 may be positioned out of view of the guest(s) 16 within the guest area 14 and may display the imagery (e.g., emit light rays). The imagery may pass through the beam splitter 20 and then reflect off the mirror 24 as reflected imagery. Then, the beam splitter 20 may direct (e.g., reflect) the reflected imagery to form the virtual image 36 in the visualization area 34.

As shown, the display 18 and the mirror 24 may be positioned to face one another along a first axis, and the beam splitter 20 may be positioned between the display 18 and the mirror 24 along the first axis). The guest(s) 16 may see through the beam splitter 20 and view the virtual image 36 in the visualization area 34. The beam splitter 20 may be oriented in such a way that the virtual image 36 appears to be positioned in the visualization area 34. By way of example, the beam splitter 20 may be angled (e.g., at a 45 degree angle) with respect to a line of sight of the guest(s) 16 toward the visualization area 34 through the beam splitter 20. In one embodiment, the line of sight of the guest(s) 16 is cross-wise (e.g., orthogonal) to the first axis. Further, the beam splitter 20 may be made from a material, such as glass, plastic, foil, and/or a semi-transparent mirror, that includes both transmissive and reflective properties.

Additionally, the visual effects system 12 may include the Fresnel lens 22 positioned in line with the beam splitter 20 (e.g., between the beam splitter 20 and the mirror 24 along the first axis). The Fresnel lens 22 may include concentric rings or grooves on a flat surface. The concentric rings or grooves of the Fresnel lens 22 may act as individual prisms, bending the light rays and focusing the light rays towards a central point, which is a focal point of the Fresnel lens 22. Thus, the Fresnel lens 22 may gather and concentrate the light rays (e.g., passing through the beam splitter 20) in a specific direction (toward the mirror 24 and/or toward the beam splitter 20). For example, the light rays from the imagery of the display 18 may pass from the beam splitter 20 through the Fresnel lens 22 and to the mirror 24. The mirror 24 may then reflect the light rays back through the Fresnel lens 22 and to the beam splitter 20.

As shown in FIG. 1, the mirror 24 may be in a first position. The mirror 24 may be supported and driven by the drive system 26, which may include a first movement mechanism 38 and a second movement mechanism 40. That is, the mirror 24 may be positioned (e.g., mounted, coupled) on the drive system 26. The drive system 26 may enable linear or non-linear movement of the mirror 24 to a second position (e.g., movement relative to the display 18 and/or a ground surface of the attraction 10). In one embodiment, the drive system 26 may enable movement in any direction and/or along multiple axes, such as forward (e.g., toward the display 18), backward (e.g., away from the display 18), to the left, and/or to the right. In this manner, the drive system 26 may enable the mirror 24 to move through relatively large distances (e.g., gross movement; more than 1 meter) along tracks 42, but also to move repeatedly or oscillate through relatively small distances (e.g., small movement; less than one meter) relative to the tracks 42.

In one embodiment, the first movement mechanism 38 and/or the second movement mechanism 40 may be coupled to at least one actuator, which may actuate to cause the first movement mechanism 38 and the second movement mechanism 40 to move the mirror 24. For example, the at least one actuator may be a piston, a hydraulic cylinder, a pneumatic cylinder, a hydraulic motor, a pneumatic motor, an electric motor, another suitable actuator, and the like. After actuation by the at least one actuator, the first movement mechanism 38 and the second movement mechanism 40 may slide, rotate, turn, or perform any suitable movement to cause the mirror 24 to move along the tracks 42. For example, the first movement mechanism 38 and the second movement mechanism 40 may be wheels, spheres, rotatable plates, another suitable movement mechanism, or a combination thereof. In another embodiment, the drive system 26 may include more or fewer movement mechanisms (e.g., one movement mechanism, three movement mechanisms, six movement mechanisms). The drive system 26 may operate to move (e.g., oscillate) the mirror 24 to affect (e.g., adjust) depth of the virtual image 36 (e.g., perceived depth by the guest(s) 16; at a location in the visualization area 34), the size of the virtual image 36 (e.g., appear larger or appear smaller), and/or cause the virtual image 36 to appear as the volumetric image.

Moreover, the visual effects system 12 may include the controller 28 (e.g., an automation controller, a programmable logic controller, an electronic controller) configured to operate to adjust an experience provided to the guest(s) 16 via the visual effects system 12. The controller 28 may include the memory 30 and the processor 32. The memory 30 may include volatile memory, such as random access memory (RAM), and/or non-volatile memory, such as read-only memory (ROM), optical drives, hard disc drives, solid-state drives, or any other non-transitory computer-readable medium that includes instructions. The processor 32 may be configured to execute such instructions. For example, the processor 32 may include one or more application specific integrated circuits (ASICs), one or more field programmable gate arrays (FPGAs), one or more general purpose processors, or any combination thereof.

The controller 28 may communicate (e.g., transmit, send) image data to cause the display 18 to provide the imagery (e.g., emit the light rays) based on the image data. The controller 28 may adjust and update the image data transmitted to the display 18 to adjust the appearance of the virtual image 36 perceived by the guest(s) 16. As noted herein, the controller 28 may also move the mirror 24 to adjust the depth of the virtual image 36 in the visualization area 34.

As another example, the controller 28 may communicate the image data to cause the display to provide the imagery as the series of image frames with a refresh rate (e.g., frames per second), and the controller 28 may instruct the drive system 26 to move the mirror 24 based on the refresh rate (e.g., oscillation cycles per second). Further, in one embodiment, the refresh rate and the movement of the mirror 24 may be fast enough to combine the reflected image frames into the volumetric imagery via persistence of vision. For example, the refresh rate may be at least 500 frames per second and oscillation of the mirror 24 may provide at least 25 oscillation cycles per second (e.g., the mirror 24 oscillates over a travel distance of 10 centimeters along the first axis and is at each location at least 25 times per second). Persistence of vision may result when a human mind combines the series of image frames (e.g., due to a human eye retaining images for up to a sixteenth of a second). In particular, successive reflected image frames (e.g., two-dimension (2D) image frames) that are presented over a volume (e.g., at different respective depths in the visualization area 34 via the movement of the mirror 24) faster than the human eye can process images results in convergence of the successive reflected image frames such that the successive reflected image frames are observed by the guest(s) 16 as the volumetric imagery. Further, a rate of movement of the mirror 24 may be adjusted to adjust voxel density (e.g., different densities of the reflected image frames at different depths in the visualization area 34).

Figure 2:
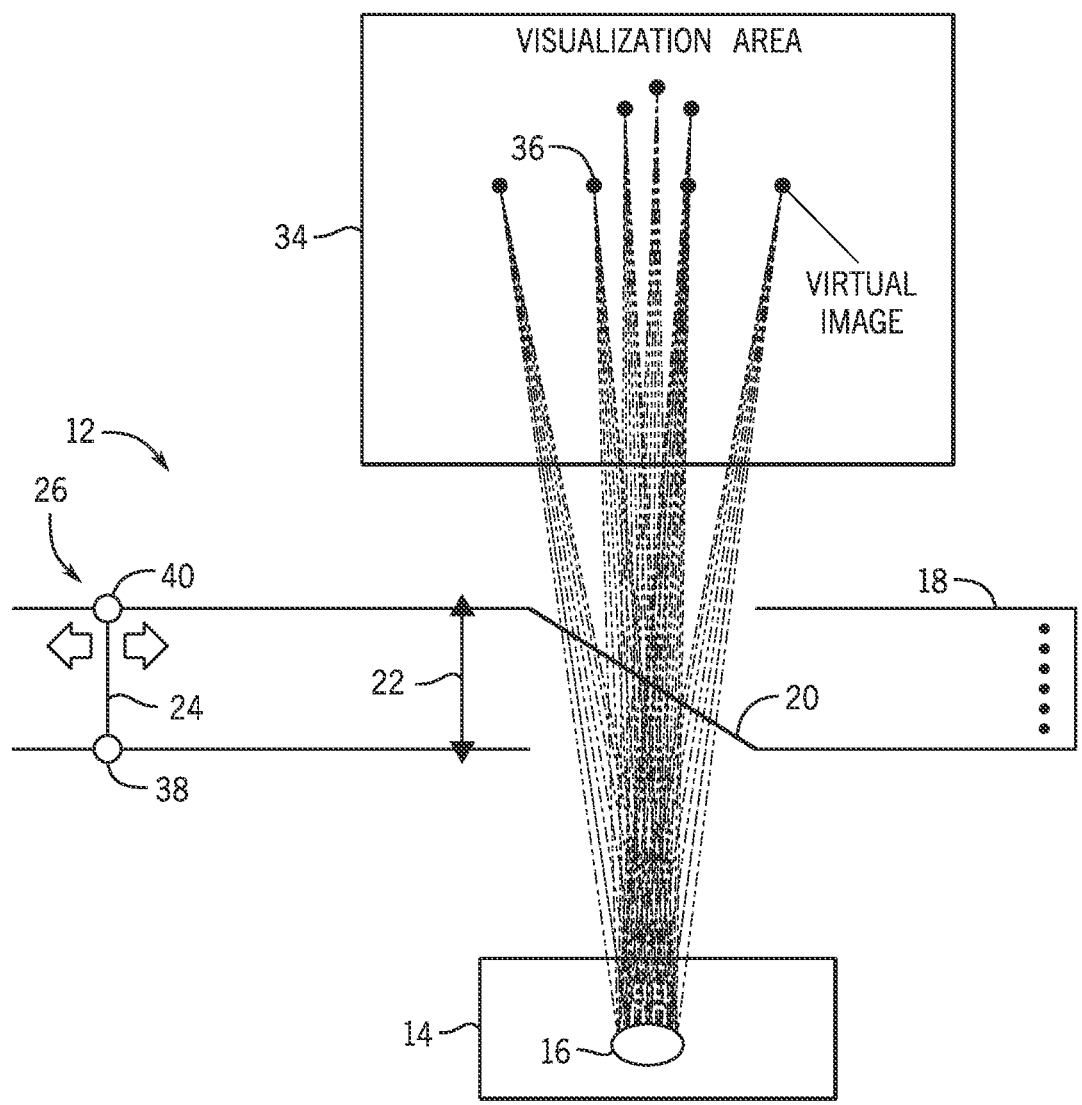
FIG. 2 is a schematic diagram of the attraction that includes the visual effects system of FIG. 1 with the mirror in a second position, in accordance with an embodiment of the present disclosure.

FIG. 2 is a schematic diagram of the attraction 10 that includes the visual effects system 12 of FIG. 1, with the mirror 24 in the second position, in accordance with an embodiment of the present disclosure. As mentioned herein, the mirror 24 may be driven (e.g., shifted, moved, translated) by the first movement mechanism 38 and the second movement mechanism 40 of the drive system 26. The movement of the mirror may cause the virtual image 36 to be perceived by the guest(s) 16 at the different depths, sizes, and/or as the volumetric imagery.

As illustrated in FIG. 2, the mirror 24 may be driven further away from the location of Fresnel lens 22, the beam splitter 20, and the display 18 to the second position via the drive system 26. Therefore, the virtual image 36 may be perceived by the guest(s) 16 to be at a further distance away in the visualization area 34. For example, the mirror 24 may be driven two feet away from the Fresnel lens 22, the beam splitter 20, and the display. The depth of the virtual image 36 displayed may be double a travel distance of the mirror 24. Thus, in this example, the virtual image 36 may be perceived by the guest(s) 16 to have moved four feet away. It should be appreciated that the gross movements and the small movements may be used together to create the volumetric imagery at different depths during the experience in the attraction 10. For example, the mirror 24 may oscillate at the first position to create a first volumetric image at a first depth region in the visualization area 34, and then the mirror 24 may oscillate at the second position to create a second volumetric image at a second depth region in the visualization area 34, and so forth.

Figure 3:
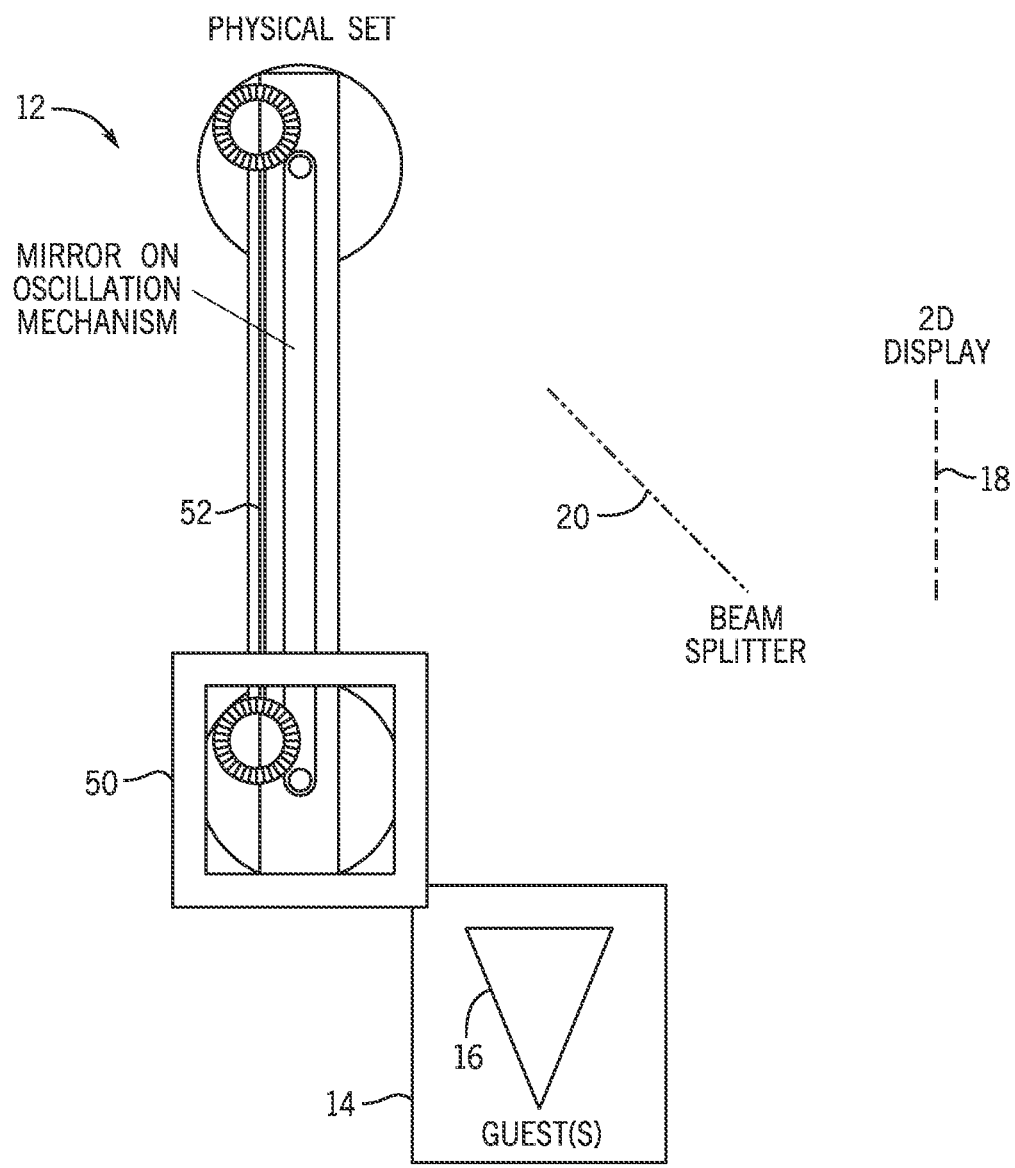
FIG. 3 is a top view of the visual effects system of FIG. 1, wherein the mirror is coupled to a drive system, in accordance with an embodiment of the present disclosure.

FIG. 3 is a top view of the visual effects system 12 of FIG. 1, wherein the drive system 26 includes a motor 50, in accordance with an embodiment of the present disclosure. The visual effects system 12 may include the display 18, the beam splitter 20, and the mirror 24. Further, the visual effects system 12 may include the mirror 24 mounted to the drive system 26, which may include the first movement mechanism 38 and the second movement mechanism 40. While the visual effects system 12 is shown to be devoid of the Fresnel lens, it should be appreciated that the Fresnel lens may be provided.

While the drive system 26 may be configured to move the mirror 24 to oscillate linearly (e.g., via linear actuators; only linearly along the first axis), it is presently recognized that this may wear components of the drive system 26 over time. Further, such movement may include periods of acceleration and deceleration in order to change directions, which may affect appearance of the virtual image 36 (e.g., different densities at different depths for a constant refresh rate). In some cases, the controller 28 may account for the periods of acceleration and deceleration, such as by variably adjusting the refresh rate (e.g., more frames during full speed linear movement, fewer frames during acceleration and deceleration) and/or via other techniques.

Advantageously, because the visual effects system 12 provides the visual effects by moving the mirror 24 (e.g., instead of by moving the display 18), the drive system 26 may move the mirror 24 to oscillate via non-linear movement (e.g., via rotation) without skewing the virtual image 36. For example, with reference to FIG. 3, the first movement mechanism 38 and/or the second movement mechanism 40 may include rotatable plates that support the mirror 24 and that are coupled to one another via a linkage 52 (e.g., parallel linkage). In particular, a first edge portion of the mirror 24 is mounted on the first movement mechanism 38 and a second edge portion of the mirror 24 is mounted on the second movement mechanism 40. The mirror 24 may be mounted on the first movement mechanism 38 and the second movement mechanism 40 to be radially offset from respective rotational or center axes of the first movement mechanism 38 and the second movement mechanism 40.

In FIG. 3, the first movement mechanism 38 is coupled (e.g., non-rotatably coupled; fixed) to the motor 50 (e.g., to an output shaft of the motor 50). Further, the motor 50 may operate to rotate the first movement mechanism 38 in a clockwise or counterclockwise direction (e.g., about a respective rotational or center axis), and the second movement mechanism 40 may also move (e.g., about a respective rotational or center axis) with the first movement mechanism 38 due to the linkage 52. As the first movement mechanism 38 and the second movement mechanism 40 rotate in the manner, the mirror 24 may also shift in position (e.g., effectively oscillate along the first axis toward and away from the display, with some components of movement along the second axis or crosswise to the first axis that do not skew the virtual image 36) while continuing to face toward the display 18. Additional details with regard to the movement provided by the drive system 26 via the first movement mechanism 38, the second movement mechanism 40, and the motor 50 will be discussed below with reference to FIG. 4.

Figure 4:
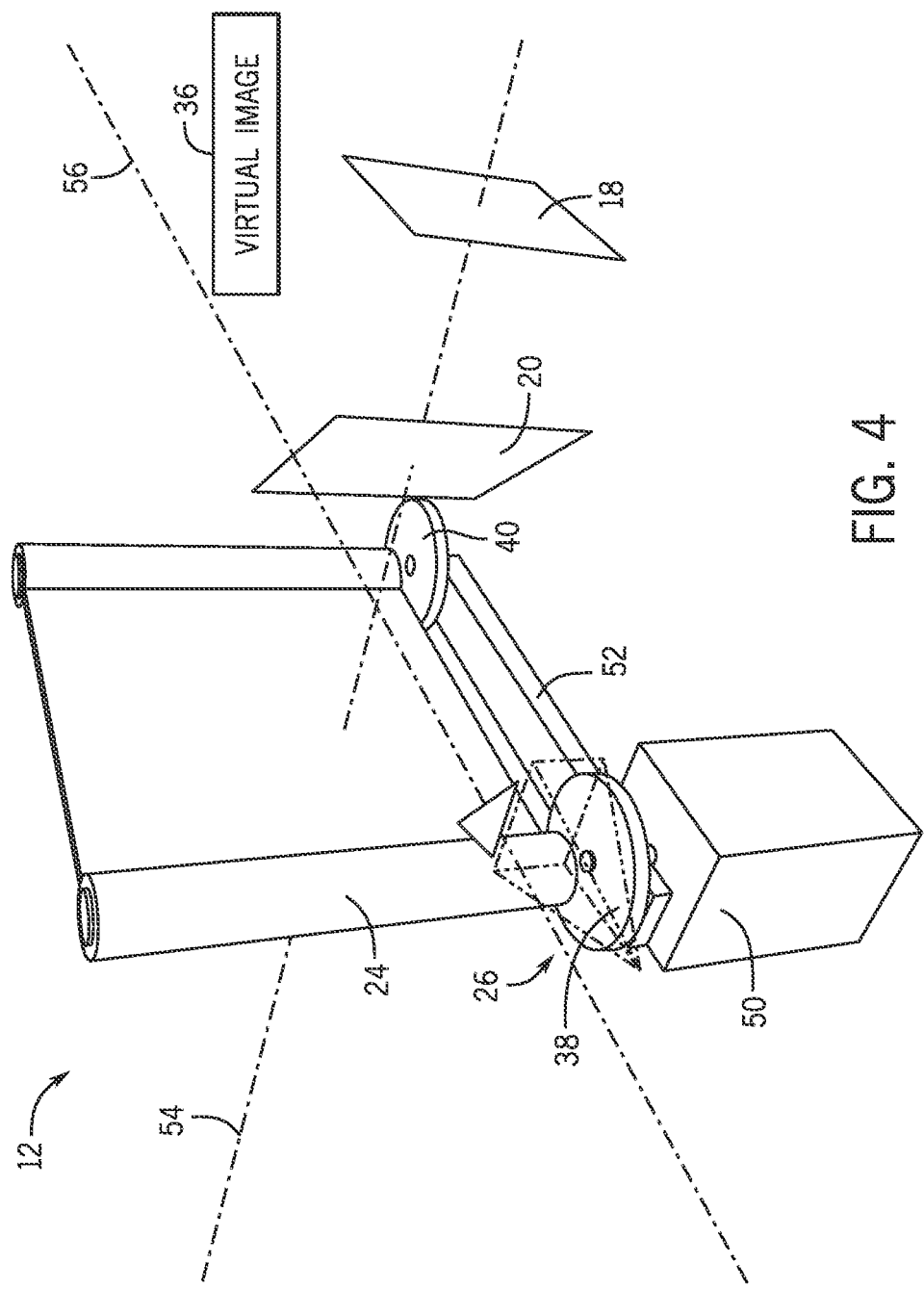
FIG. 4 is a perspective view of the visual effects system of FIG. 1, wherein the mirror is coupled to the drive system, in accordance with an embodiment of the present disclosure.

FIG. 4 is a perspective view of the visual effects system 12 of FIG. 1, wherein the drive system 26 is coupled to the motor 50, in accordance with an embodiment of the present disclosure. As described herein, the drive system 26 may enable the forward and backward movement of the mirror 24 along a first axis 54. Further, the drive system 26 may enable the side-to-side (e.g., to the left or to the right) movement along a second axis 56. As such, components of linear and/or non-linear motion may be achieved via the drive system 26 coupled to the motor 50.

As illustrated in FIG. 4, the motor 50 is coupled to the first movement mechanism 38. As the motor 50 rotates the first movement mechanism 38 in the clockwise direction, the second movement mechanism 40 may also rotate in the clockwise direction simultaneously. As an example, the drive system 26 may drive the first movement mechanism 38 and the second movement mechanism 40, as well as the mirror 24 coupled thereto, at a high speed. In this manner, the mirror 24 may effectively oscillate along the first axis 54, and thus, appearance of the virtual image 36 as volumetric imagery may be efficiently achieved.

It should be appreciated that the drive system 26 may have any of a variety of configurations and/or components. For example, it should be appreciated that the motor 50 may be coupled to either the first movement mechanism 38 or the second movement mechanism 40. Additionally, the drive system 26 may include multiple motor(s) 50 to support movement of the mirror 24 as described herein. Further, the motor(s) 50 may be utilized in combination with linear actuators that drive the gross movements of the mirror 24 along the first axis, for example.

In one embodiment, the drive system 26 may include a crankshaft and a connecting rod. The crankshaft may be driven to rotate (e.g., via its own motor and/or a piston). The crankshaft may be a round crankshaft or an elliptical crankshaft. The round crankshaft may produce uniform round motion and the elliptical crankshaft may produce non-uniform motion due to its asymmetrical shape. The rotation of the crankshaft may cause the drive system 26, and thus the mirror 24, to move forward, backward, to the right, and/or to the left relative to the tracks 42.

Figure 5:
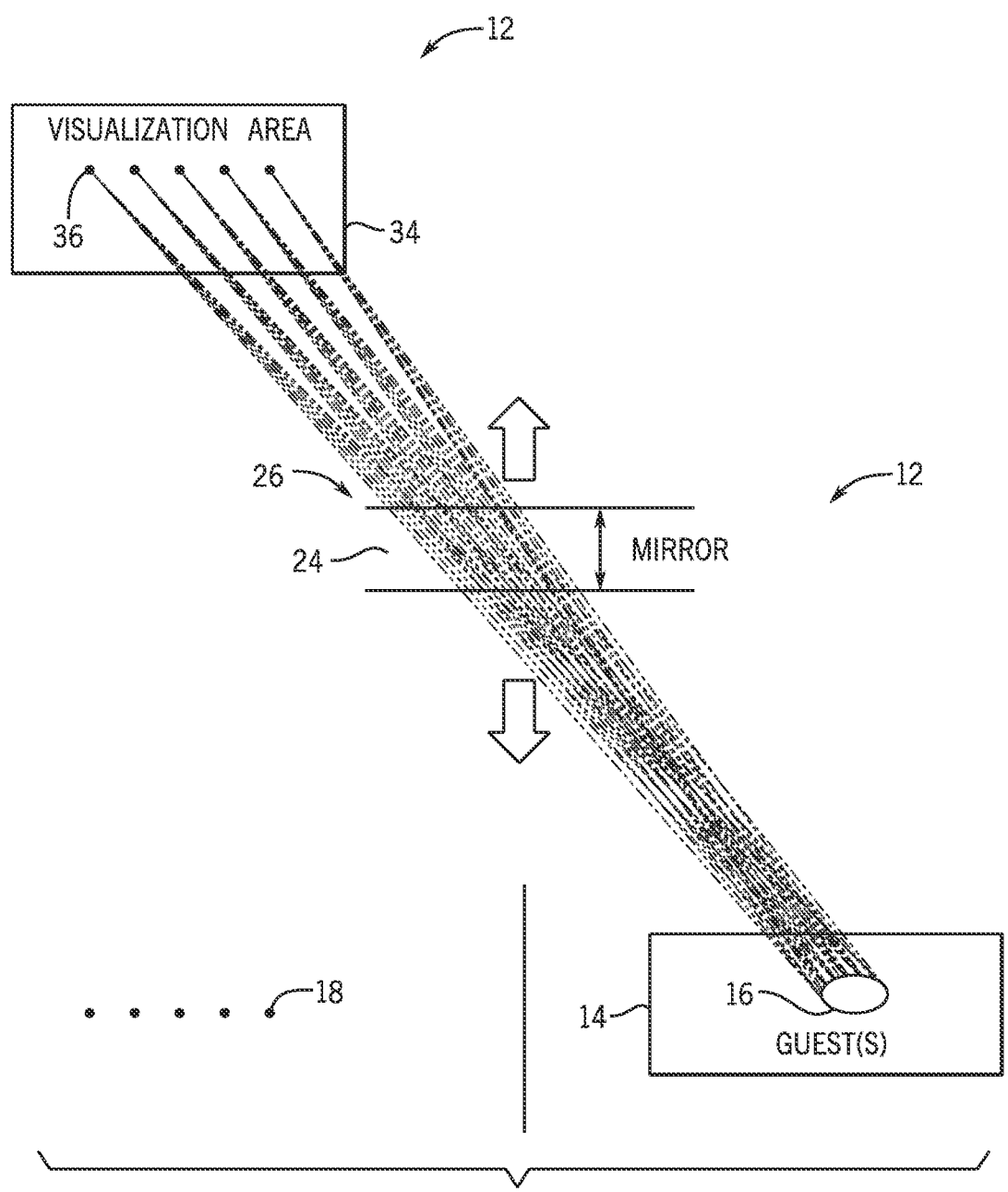
FIG. 5 is a top view of a visual effects system, wherein visual effects are viewable via a mirror, in accordance with an embodiment of the present disclosure.

FIG. 5 is a top view of an embodiment of the visual effects system 12, wherein visual effects are viewable via the mirror 24. That is, the visual effects system 12 may be devoid of the beam splitter 20 and the Fresnel lens 22. As illustrated in FIG. 5, the display 18 may be positioned at a height above the guest(s) 16 and may be positioned to face the mirror 24. Additionally, the mirror 24 may be positioned in front of the guest(s) 16 and/or the display 18. The display 18 may display the image, which may reflect off of the mirror 24. The virtual image 36 may be visible to the guest(s) 16 in the visualization area 34 via the mirror 24.

Further, the mirror 24 may be positioned on the drive system 26, as described herein, such as with respect to FIG. 1. The drive system 26 may drive the mirror 24 forward and backward (e.g., toward and away from the display 18). As such, a perceived depth of the virtual image 36 visible to the guest(s) 16 may vary. That is, the virtual image 36 may appear closer to the guest(s) or further away from the guest(s) 16. Moreover, the virtual image 36 may be perceived by the guest(s) 16 as volumetric imagery due to the movement of the mirror 24 in combination with updating the imagery (e.g., the set of image frames) displayed by the display 18. It should be noted that although the display 18 is described as being positioned at a height above the guest and the mirror 24 is described as being in front of the display 18 and/or the guest(s) 16, the display 18 and the mirror 24 may be in any suitable position to enable the guest(s) 16 to view the virtual image 36.

Figure 6:
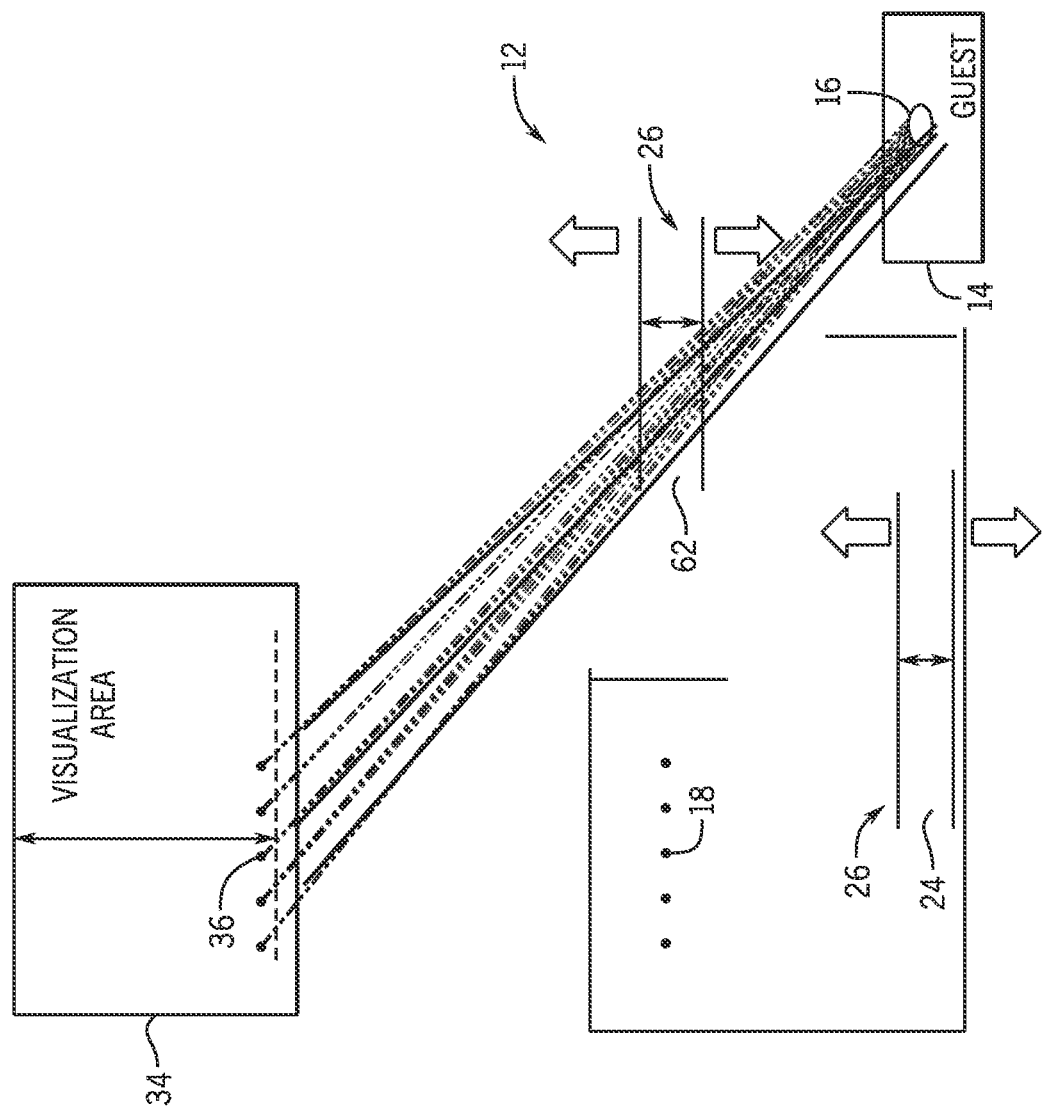
FIG. 6 is a top view of a visual effects system, wherein visual effects are viewable via a mirror and an additional mirror, in accordance with an embodiment of the present disclosure.

FIG. 6 is a top view of an embodiment of the visual effects system 12, wherein the visual effects are viewable via the mirror 24 (e.g., a first mirror) and an additional mirror 62 (e.g., a second mirror. The visual effects system 12 may be devoid of the beam splitter 20 and the Fresnel lens 22. Further, the visual effects system 12 may include the additional mirror 62, which may be positioned to be facing the mirror 24 and/or the guest(s) 16. Moreover, the additional mirror 62 may be positioned to be facing the mirror 24. As such, the display 18 may display the imagery (e.g., the set of image frames), which may reflect off the mirror 24 and may subsequently reflect off the additional mirror 62. The virtual image 36 may be visible to the guest(s) 16 in the visualization area 34 via the additional mirror 62 and the mirror 24.

Additionally, the mirror 24 and the additional mirror 62 may each be positioned on the drive system 26, respectively. The drive system 26 may enable at least forward and backward (e.g., toward and away from the display 18) oscillation of the mirror 24 and the additional mirror 62. The oscillation of the mirror 24 and the additional mirror 62 may increase a distance or depth doubling effect by a factor of two. For example, movement of the mirror 24 by a particular distance may cause the virtual image 36 to appear to move two times the particular distance (e.g., two times the perceived depth). Further, when including the additional mirror 62, the movement of the mirror 24 by a particular distance and the movement of the additional mirror 62 by the particular distance may cause the virtual image 36 to move four times the particular distance the mirror 24. Thus, smaller movements may enable more efficient presentation of the virtual image 36 as volumetric imagery in the visualization area 34.

It should be noted that although the visual effects system 12 is described in FIG. 6 with respect to the mirror 24 and the additional mirror 62, any additional number of mirrors may be included in the visual effects system 12. For each mirror added to the number of mirrors of the visual effects system 12, the distance or depth change effect may increase by a factor of two.

Figure 7:
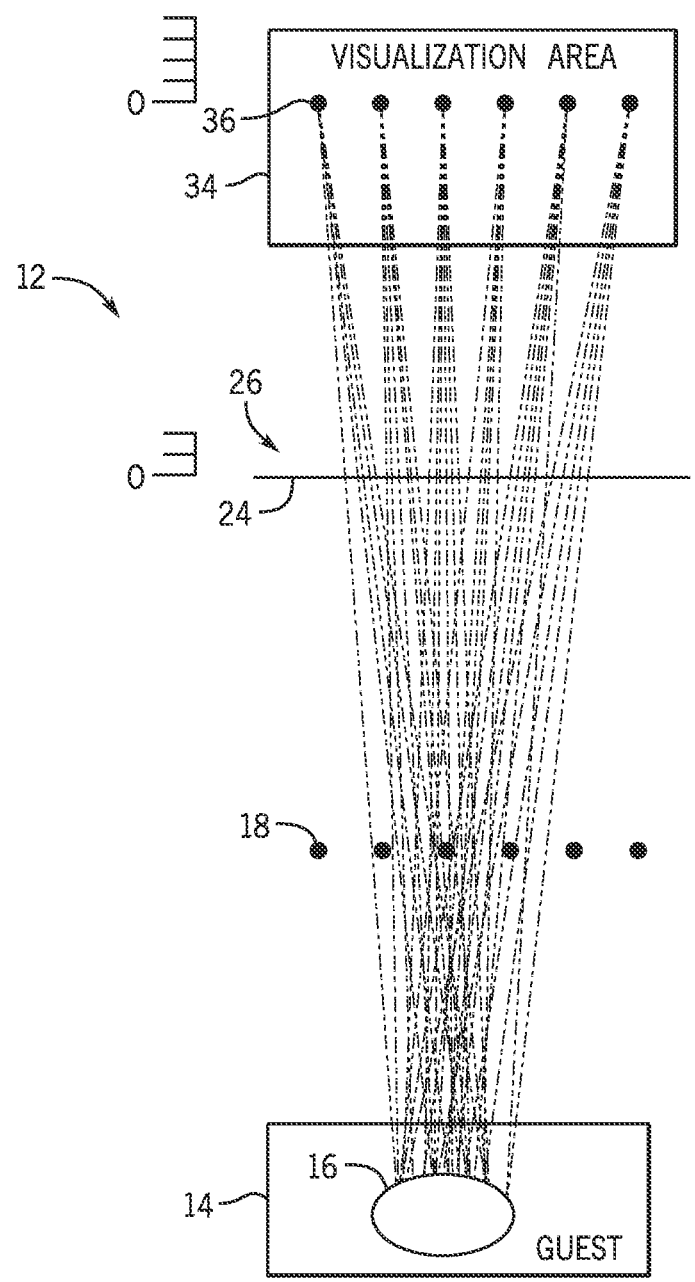
FIG. 7 is a top view of a visual effects system, wherein visual effects are viewable through a display, wherein the display is transparent, in accordance with an embodiment of the present disclosure.

FIG. 7 is a top view of an embodiment of the visual effects system 12, wherein the visual effects are viewable through the display 18. The display 18 may include the transparent (e.g., see-through) display. The display 18 may be in any position between the guest(s) 16 and the mirror 24 that may enable visualization of the virtual image 36 in the visualization area 34 by the guest(s) 16 looking through the display 18. The display 18 may display the imagery (e.g., the set of image frames), which may reflect off the mirror 24 as reflected imagery. Because the display 18 is transparent, the guest(s) may see through the display 18 to directly view the virtual image 36 as the reflected imagery reflected by the mirror. Further, as described herein, the mirror 24 may be positioned on the drive system 26, which may drive the mirror 24 at least forward and backward (e.g., toward and away from the display 18). That is, the controller 28 may transmit the image data to cause the display 18 to provide the imagery as the series of image frames with the refresh rate, and the controller 28 may instruct the drive system 26 to move the mirror 24 at least forward and backward based on the refresh rate. Thus, the perceived depth of the virtual image 36 presented may be affected (e.g., to produce an appearance of movement of the virtual image 36, such as toward and away from the guest(s) 16 in the visualization area 34) and/or the volumetric imagery may be produced as the mirror 24 moves forward and backward based on the instruction from the controller 28. Thus, in one embodiment, the controller 28 may instruct the display 18 to present the imagery as the series of image frames and the drive system 26 to move the mirror 24 in a coordinated manner that produces appearance of movement of an object and/or a character represented by the virtual image 26 from a perspective of the guest(s) 16 in the visualization area 34. Indeed, these techniques may be applied in any configuration of the visual effects system 12 disclosed herein.

In one embodiment, the display 18 may include a scrim and a projector. As the projector projects light behind the scrim, the scrim may appear transparent or translucent. The guest(s) 16 may view directly through the scrim at the mirror 24 to view the virtual image 36 in the visualization area 34. Moreover, the scrim may be positioned on the drive system 26, which may drive the scrim forward and backward to affect the depth of the virtual image 36 and/or produce the volumetric imagery.

FIG. 8 is a perspective view of an embodiment of the visual effects system 12, wherein the visual effects are viewable via a disk 70 (e.g., rotatable structure) with the mirror 24 (e.g., mirror assembly) that is formed from or includes multiple mirror segments (e.g., 24a, 24b, 24c, 24d, 24e, 24f). The multiple mirror segments may be coupled to the disk 70 via suitable support structures 72 (e.g., rods, columns, sticks, poles, fasteners). Each mirror segment of the multiple mirror segments may be raised at a respective different height relative to the disk 70 (e.g., 5 centimeters, 10 centimeters, 15 centimeters, and so forth; increasing incrementally and in order circumferentially about the disk 70). That is, a respective length of each support structure of the support structures 72 may be a different length. Additionally, it should be noted that any number of mirror segments may be coupled to the disk 70 via the support structures 72.

A covering 74 with an opening 76 may cover the disk 70. The opening 76 may display a single mirror segment of the multiple mirror segments at one time. The cover 74 may include any suitable material that may be used to overlay and/or block reflection by remaining mirror segments of the multiple mirror segments at the one time (e.g., and also to hide at least portions of the disk 70 from view of the guest(s) 16). In an embodiment, the number of mirror segments used on the disk 70 may correlate to a refresh rate that may be used to present the imagery on the display 18. While the display 18 is not shown in FIG. 8 for image clarity, it should be appreciated that the display 18 may be positioned to face the multiple mirror segments on the disk 70 such that the single mirror segment of the multiple mirror segments that is aligned with the opening 76 may reflect the imagery (e.g., the light rays) presented on the display 18 (for example, the multiple mirror segments may be used in place of the mirror 24 shown in FIG. 1).

In operation, the display 18 may present the imagery (e.g., the set of image frames) that is then reflected by the multiple mirror segments on the disk 70. In particular, the disk 70 may be spun such that each mirror segment of the multiple mirror segments may align with the opening 76 and reflect the imagery as reflected imagery to form the virtual image 36. The display 18 may update the imagery at the refresh rate, which is coordinated with a rotation rate of the disk 70. For example, each image frame may be presented as a corresponding mirror segment of the multiple mirror segments aligns with the opening 76. The respective different heights of each mirror segment of the multiple mirror segments may affect the perceived depth at which each reflected image frame is provided as part of the virtual image 36. In this way, the guest(s) 16 may perceive each image frame to be at different perceived depths and/or the guest(s) 16 may perceive the set of image frames (e.g., as reflected by the multiple mirror segments) to from the volumetric imagery. A change in the perceived depth of the virtual image 36 and/or the production of volumetric imagery may be efficiently achieved by spinning the disk 70 with the multiple mirror segment at the respective different heights.

In one embodiment, a disk balancer may be used to measure and/or provide a balance of the disk 70. If a weight of the disk 70 is imbalanced, weights (e.g., lead, steel) may be attached to the disk 70 to bring the disk 70 into balance. In this manner, the disk 70 may have an even distribution of weight around its axis of rotation. In one embodiment, additional mirror segments may be attached to an opposite side of the disk 70. The additional mirror segments attached to the opposite side may act as weights to balance the disk 70. Further, the additional mirror segments may allow an additional virtual image to be displayed to the guest(s) 16 (e.g., two groups of the guest(s) 16). As such, the additional mirror segments may enhance visual effects by simultaneously displaying the virtual image 36 and the additional virtual image on opposite sides of the disk 70.

Accordingly, visual effects such as the perceived depth and size of virtual imagery and/or production of volumetric imagery presented to guests may be more efficiently achieved. That is, adjusting the size and depth of the virtual imagery and/or producing the volumetric imagery for the guests may be more mechanically and electrically efficient (e.g., as compared to moving the display, which may be relatively fragile compared to the mirror and/or include cables and other electrical components; due to doubling of the perceived depth that is provided by movement of the mirror). Further, the production of these visual effects may provide a more enjoyable experience for the guests, while enabling a simpler implementation to achieve the visual effects.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any features shown in FIGS. 1-8 or described herein may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A visual effects system, comprising:
a display configured to present a series of image frames;
a mirror positioned to reflect the series of image frames to generate reflected image frames; and
a drive system coupled to the mirror, wherein the drive system is configured to:
drive movement of the mirror to oscillate along a first portion of a track with a reflective surface of the mirror facing toward the display to adjust a perceived depth of the reflected image frames to produce volumetric imagery in a first visualization region for visualization by a guest;
drive a gross movement of the mirror to position the mirror along a second portion of the track; and
drive the movement of the mirror to oscillate along the second portion of the track with the reflective surface of the mirror facing toward the display to adjust the perceived depth of the reflected image frames to produce the volumetric imagery in a second visualization region for visualization by the guest.

2. The visual effects system of claim 1, wherein the display is configured to present the series of image frames at a refresh rate, and the drive system is configured to drive the movement of the mirror based on the refresh rate to produce the volumetric imagery.

3. The visual effects system of claim 1, wherein the drive system is configured to move the mirror along a first axis toward and away from the display.

4. The visual effects system of claim 3, comprising a beam splitter positioned to direct the reflected image frames to a visualization area and to enable the guest to view the volumetric imagery in the visualization area through the beam splitter.

5. The visual effects system of claim 4, wherein the beam splitter is positioned to direct the reflected image frames along a second axis to the visualization area.

6. The visual effects system of claim 4, comprising a compact lens configured to concentrate the series of image frames and the reflected image frames between the beam splitter and the mirror.

7. The visual effects system of claim 1, wherein the drive system comprises:
a motor;
at least one rotatable structure coupled to the motor and the mirror; and
wherein the motor is configured to drive the at least one rotatable structure to oscillate about a rotational axis to drive the movement of the mirror with the reflective surface of the mirror facing toward the display to adjust the perceived depth of the reflected image frames to produce the volumetric imagery.

8. The visual effects system of claim 1, wherein the display is stationary relative to a ground surface, and the drive system is configured to drive the movement of the mirror relative to the display and the ground surface.

9. The visual effects system of claim 1, wherein the display is transparent and is configured to enable the visualization of the volumetric imagery through the display.

10. The visual effects system of claim 1, comprising a controller configured to instruct the drive system to drive the movement of the mirror.

11. A method of operating a visual effects system, the method comprising:
generating, at one or more processors, image data for a display;
transmitting, via the one or more processors, the image data to the display, wherein the display is configured to display a series of image frames based on the image data;
reflecting, via a mirror, the series of image frames to generate reflected image frames;
moving, via a drive system, the mirror to oscillate along a first portion of a track with a reflective surface of the mirror facing toward the display to adjust a perceived depth of the reflected image frames to produce volumetric imagery in a first visualization region for visualization by a guest;
moving, via the drive system, the mirror to position the mirror along a second portion of the track; and
moving, via the drive system, the mirror to oscillate along the second portion of the track with the reflective surface of the mirror facing toward the display to adjust the perceived depth of the reflected image frames to produce the volumetric imagery in a second visualization region for visualization by the guest.

12. The method of claim 11, comprising moving, via the drive system, the mirror at an oscillation rate based on a refresh rate of the series of image frames to produce the volumetric imagery.

13. The method of claim 11, comprising transmitting, via the one or more processors, an instruction to the drive system to move the mirror to adjust the perceived depth of the reflected image frames to produce the volumetric imagery.

14. The method of claim 13, comprising transmitting, via the one or more processors, the instruction to the drive system to move the mirror to produce an appearance of movement of the volumetric imagery.

15. A visual effects system, comprising:
a display configured to present a series of image frames;
a mirror positioned to reflect the series of image frames to generate reflected image frames;
a beam splitter positioned to direct the reflected image frames to a visualization area; and
a drive system coupled to the mirror, wherein the drive system is configured to:
drive movement of the mirror to oscillate along a first portion of a track with a reflective surface of the mirror facing toward the display to adjust a perceived depth of the reflected image frames to produce volumetric imagery in a first visualization region of the visualization area for visualization by a guest;
drive a gross movement of the mirror to position the mirror along a second portion of the track; and
drive the movement of the mirror to oscillate along the second portion of the track with the reflective surface of the mirror facing toward the display to adjust the perceived depth of the reflected image frames to produce the volumetric imagery in a second visualization region of the visualization area for visualization by the guest.

16. The visual effects system of claim 15, comprising a controller, wherein the display is configured to present the series of image frames at a refresh rate, and the controller is configured to instruct the drive system to drive the movement of the mirror based on the refresh rate to combine the reflected image frames to form the volumetric imagery.

17. The visual effects system of claim 15, wherein the reflective surface of the mirror is spaced apart from and faces the display along a first axis, and the drive system is configured to move the mirror along the first axis toward and away from the display with the reflective surface continuing to face the display along the first axis to adjust the perceived depth of the reflected image frames in the visualization area for visualization by the guest.

18. The visual effects system of claim 17, wherein the beam splitter is positioned to direct the reflected image frames along a second axis to the visualization area.

19. The visual effects system of claim 15, comprising a compact lens configured to concentrate the series of image frames and the reflected image frames between the beam splitter and the mirror.

* * * * *